United States Patent
Chen et al.

(10) Patent No.: US 10,700,833 B2
(45) Date of Patent: Jun. 30, 2020

(54) TRANSMISSION PARAMETER CONFIGURATION METHOD AND BASE STATION, INFORMATION TRANSMISSION METHOD AND TERMINAL, AND STORAGE MEDIUM

(71) Applicant: ZTE CORPORATION, Guangdong (CN)

(72) Inventors: Yijian Chen, Guangdong (CN); Zhaohua Lu, Guangdong (CN); YuNgok Li, Guangdong (CN); Peng Hao, Guangdong (CN); Hao Wu, Guangdong (CN)

(73) Assignee: ZTE Corporation, Guangdong (CN)

( * ) Notice: Subject to any disclaimer, the term of this patent is extended or adjusted under 35 U.S.C. 154(b) by 43 days.

(21) Appl. No.: 16/301,311

(22) PCT Filed: Apr. 28, 2017

(86) PCT No.: PCT/CN2017/082490
§ 371 (c)(1),
(2) Date: Nov. 13, 2018

(87) PCT Pub. No.: WO2017/193831
PCT Pub. Date: Nov. 16, 2017

(65) Prior Publication Data
US 2019/0199498 A1    Jun. 27, 2019

(30) Foreign Application Priority Data
May 13, 2016  (CN) .......................... 2016 1 0322389

(51) Int. Cl.
*H04W 72/04*     (2009.01)
*H04L 5/00*       (2006.01)

(52) U.S. Cl.
CPC .......... *H04L 5/0048* (2013.01); *H04L 5/0007* (2013.01); *H04L 5/0044* (2013.01)

(58) Field of Classification Search
CPC .... H04L 5/0048; H04L 5/0007; H04L 5/0044
See application file for complete search history.

(56) References Cited

U.S. PATENT DOCUMENTS

| 7,411,924 B2 | 8/2008 | Cho et al. |
| 2005/0180354 A1 | 8/2005 | Cho et al. |
| (Continued) | | |

FOREIGN PATENT DOCUMENTS

| CN | 101582751 A | 11/2009 |
| CN | 101682467 A | 3/2010 |
| (Continued) | | |

OTHER PUBLICATIONS

International Search Report dated Jun. 23, 2017 for International Application No. PCT/CN2017/082490, 5 pages.
(Continued)

*Primary Examiner* — Melvin C Marcelo
(74) *Attorney, Agent, or Firm* — Knobbe, Martens, Olson & Bear, LLP

(57) ABSTRACT

Provided is a transmission parameter configuration method, information transmission method and terminal, and storage medium, including: configuring, by a base station, N basic transmission parameter sets, where N>1; transmitting M types of channels and/or signals by adopting the N basic transmission parameter sets, where N≤M; determining, by a terminal, the N basic transmission parameter sets; selecting, according to reference information, a target basic transmission parameter set from the N basic transmission parameter sets, where the reference information includes a type of a channel or a signal to be transmitted, and/or blind-detected preamble sequence information, and/or a bandwidth, and/or
(Continued)

Configure N basic transmission parameter sets; the N basic transmission parameter sets include one or more parameters of a group consisting of: a time domain signal length, a sub-carrier number, a sub-carrier density, a sub-carrier spacing, a frequency domain guard band, a time domain guard time length, a CP length, the number of FFT points, a baseband modulation mode; N>1     201

Transmit M types of channels and/or signals by adopting the N basic transmission parameter sets; N≤M     202 the number of transmission layers, and/or the number of antenna ports; and transmitting the channel or the signal by adopting the target basic transmission parameter set which is selected.

20 Claims, 5 Drawing Sheets

(56) References Cited

U.S. PATENT DOCUMENTS

| | | | |
|---|---|---|---|
| 2007/0105508 A1* | 5/2007 | Tong | H04B 7/0669 455/101 |
| 2008/0130485 A1* | 6/2008 | Yang | H04L 5/0007 370/208 |
| 2008/0240030 A1 | 10/2008 | Kolding et al. | |

FOREIGN PATENT DOCUMENTS

| | | |
|---|---|---|
| CN | 101977446 A | 2/2011 |
| CN | 102404854 A | 4/2012 |

OTHER PUBLICATIONS

Written Opinion of the International Searching Authority dated Jun. 23, 2017 for International Application No. PCT/CN2017/082490, 3 pages.

* cited by examiner

US 10,700,833 B2

TRANSMISSION PARAMETER CONFIGURATION METHOD AND BASE STATION, INFORMATION TRANSMISSION METHOD AND TERMINAL, AND STORAGE MEDIUM

CROSS REFERENCE TO RELATED APPLICATIONS

This is the U.S. National Phase Application, filed under 35 U.S.C. 371, of International Patent Application No. PCT/CN2017/082490, filed on Apr. 28, 2017, which claims priority to Chinese patent application No. 201610322389.0 filed on May 13, 2016, each of which is incorporated herein by reference in its entirety.

TECHNICAL FIELD

The present disclosure relates to data transmission technologies in a communications field and, in particular, to a transmission parameter configuration method and base station, information transmission method and terminal, and storage medium.

BACKGROUND

In a wireless communication system based on an Orthogonal Frequency Division Multiplexing (OFDM) technology, generally speaking, in one basic time domain time period (such as one subframe), some basic channels and signals such as a control channel, a data channel, demodulation reference signals for the control and data channels need to exist. In some cases, a channel measurement reference signal, a positioning reference signal and a synchronization signal also need to exist. Here, the basic time domain time period has different definitions and names in different systems.

Generally speaking, channels in a resource block (RB) are multiplexed in a time-frequency division multiplexing manner. For example, a Physical Downlink Control Channel (PDCCH) and a Physical Downlink Shared Channel (PDSCH) are time division multiplexed; an Enhanced Physical Downlink Control Channel (EPDCCH) and the PDSCH are frequency division multiplexed; a Physical Hybrid ARQ Indicator Channel (PHICH) and the PDCCH are a mixed time-frequency division multiplexed; and signals and channels are also mixed time-frequency division multiplexed. For example, a Cell specific Reference Signal (CRS), a Demodulation Reference Signal (DMRS, also called UE specific RS), and a Channel State Information-Reference Signal (CSI-RS) are all embedded into the PDSCH. In a Long Term Evolution (LTE) system, main signals and channels in one RB are shown in FIG. 1.

The design of the current 4G wireless communication system has several typical features.

All channels and signals are not well distinguished in the time domain, and the time domain coupling is very strong. Time-frequency transmission resources of multiple channels or signals are included in one symbol. For example, the OFDM symbol in which the PDCCH is located includes the CRS corresponding to the control channel; the OFDM symbol in which the data channel is located includes the CRS and the DMRS, and probably the CSI-RS and the positioning reference signal (PRS). In addition, the PHICH or Physical Control Format Indicator Channel (PCFICH) may also be mixed into a PDCCH symbol, the EPDCCH may also exist in the PDCCH symbol (multiplexed in different RBs). All channels and signals in one frame all use a same basic transmission parameter set, such as subcarrier spacing, Cyclic Prefix (CP) of the OFDM symbol, the subcarrier number in per unit of bandwidth, Fast Fourier Transformation (FFT) points and baseband modulation waveform.

At least the following drawbacks exist in the related art. Different channels or signals actually have different features. For example, the control channel requires higher robustness, and the reference signal is more important to channel measurement and data demodulation. Therefore, different channels actually may have different basic transmission parameters. However, the current transmission parameters of the system are not flexible. In addition, in a case of radio frequency precoding, since the same radio frequency beam acts on this frequency band, when the bandwidth is larger and the number of subcarriers is bigger, the resource waste exists.

SUMMARY

Embodiments of the present disclosure provide a transmission parameter configuration method and base station, information transmission method and terminal, and storage medium.

The embodiments of the present disclosure provide a transmission parameter configuration method, which includes:

configuring N basic transmission parameter sets, the N basic transmission parameter sets includes one or more parameters of a group consisting of a time domain signal length, a sub-carrier number, a sub-carrier density, a sub-carrier spacing, a frequency domain guard band, a time domain guard time length, a cyclic prefix (CP) length, a number of Fast Fourier Transformation (FFT) points, a baseband modulation mode; N>1; and transmitting M types of channels and/or signals by adopting the N basic transmission parameter sets, N≤M.

In an embodiment of the present disclosure, the configuring N basic transmission parameter sets includes configuring the N basic transmission parameter sets for a terminal.

In an embodiment of the present disclosure, the N basic transmission parameter sets correspond N respective channel or signal sets. Each of the N channel or signal sets includes at least one of the M types of channels and/or signals.

In an embodiment of the present disclosure, a correspondence between the N basic transmission parameter sets and the N channel or signal sets is determined by an agreement between a base station and a terminal or is determined by the base station and configured to the terminal.

In an embodiment of the present disclosure, in the N channel or signal sets, at least one channel or signal set includes a data channel and at least one channel or signal set includes a control channel.

In an embodiment of the present disclosure, in the N channel or signal sets, at least one channel or signal set includes a data channel, at least one other channel or signal set includes a control channel, and at least one other channel or signal set includes a reference signal.

In an embodiment of the present disclosure, in the N channel or signal sets, at least one channel or signal set includes a data channel and at least one other channel or signal set includes a control channel and a reference signal.

In an embodiment of the present disclosure, in the N channel or signal sets, at least one channel or signal set includes an uplink data channel and at least one other channel or signal set includes a downlink data channel.

In an embodiment of the present disclosure, in the N channel or signal sets, at least one channel or signal set includes an uplink control channel and at least one other channel or signal set includes a downlink control channel.

In an embodiment of the present disclosure, in the N channel or signal sets, at least one channel or signal set includes a demodulation reference signal and at least one other channel or signal set includes a measurement reference signal.

In an embodiment of the present disclosure, in the N channel or signal sets, at least one channel or signal set includes an uplink reference signal and at least one other channel or signal set includes a downlink reference signal.

In an embodiment of the present disclosure, in the N channel or signal sets, at least one channel or signal set includes a synchronization signal and at least one other channel or signal set includes a data channel.

In an embodiment of the present disclosure, in the N channel or signal sets, at least one channel or signal set includes a synchronization signal and at least one other channel or signal set includes a reference signal.

In an embodiment of the present disclosure, in the N channel or signal sets, at least one channel or signal set includes an uplink synchronization signal and at least one other channel or signal set includes a downlink synchronization signal.

In an embodiment of the present disclosure, in the N channel or signal sets, at least one channel or signal set includes a synchronization signal and at least one other channel or signal set includes a control channel.

The embodiments of the present disclosure provide an information transmission method, which includes:

determining configuration of N basic transmission parameter sets, the N basic transmission parameter sets include one or more parameters of a group consisting of: a time domain signal length, a sub-carrier number, a sub-carrier density, a sub-carrier spacing, a frequency domain guard band, a time domain guard time length, a cyclic prefix (CP) length, the number of Fast Fourier Transformation (FFT) points, a baseband modulation mode; N>1;

selecting, according to reference information, a target basic transmission parameter set from the N basic transmission parameter sets, the reference information includes at least one of: a type of a channel or signal to be transmitted, blind-detected preamble sequence information, a bandwidth, and/or the number of transmission layers, and/or the number of antenna ports; and transmitting a channel or signal by adopting the selected target basic transmission parameter set.

In an embodiment of the present disclosure, the configuration of the N basic transmission parameter sets is determined by an agreement between a base station and a terminal, or the terminal receives a configuration signaling of the base station, and determines the configuration of the N basic transmission parameter sets according to the configuration signaling.

In an embodiment of the present disclosure, the reference information further includes a work frequency point and/or transmission mode configuration information.

In an embodiment of the present disclosure, the N basic transmission parameter sets correspond to N respective channel or signal sets.

In an embodiment of the present disclosure, in the N channel or signal sets, at least one channel or signal set includes a data channel and at least one other channel or signal set includes a control channel.

In an embodiment of the present disclosure, in the N channel or signal sets, at least one channel or signal set includes a data channel and at least one other channel or signal set includes a control channel, and at least one other channel or signal set includes a reference signal.

In an embodiment of the present disclosure, in the N channel or signal sets, at least one channel or signal set includes a data channel and at least one other channel or signal set includes a control channel and a reference signal.

In an embodiment of the present disclosure, in the N channel or signal sets, at least one channel or signal set includes an uplink data channel and at least one other channel or signal set includes a downlink data channel.

In an embodiment of the present disclosure, in the N channel or signal sets, at least one channel or signal set includes an uplink control channel and at least one other channel or signal set includes a downlink control channel.

In an embodiment of the present disclosure, in the N channel or signal sets, at least one channel or signal set includes a demodulation reference signal and at least one other channel or signal set includes a measurement reference signal.

In an embodiment of the present disclosure, in the N channel or signal sets, at least one channel or signal set includes an uplink reference signal and at least one other channel or signal set includes a downlink reference signal.

In an embodiment of the present disclosure, in the N channel or signal sets, at least one channel or signal set includes a synchronization signal and at least one other channel or signal set includes a data channel.

In an embodiment of the present disclosure, in the N channel or signal sets, at least one channel or signal set includes a synchronization signal and at least one other channel or signal set includes a reference signal.

In an embodiment of the present disclosure, in the N channel or signal sets, at least one channel or signal set includes an uplink synchronization signal and at least one other channel or signal set includes a downlink synchronization signal.

In an embodiment of the present disclosure, in the N channel or signal sets, at least one channel or signal set includes a synchronization signal and at least one other channel or signal set includes a control channel.

The embodiments of the present disclosure provide a base station, which includes:

a configuration unit, which is configured to configure N basic transmission parameter sets, the N basic transmission parameter sets comprise one or more parameters of a group consisting of: a time domain signal length, a sub-carrier number, a sub-carrier density, a sub-carrier spacing, a frequency domain guard band, a time domain guard time length, a cyclic prefix (CP) length, the number of Fast Fourier Transformation (FFT) points, a baseband modulation mode; N>1; and a transmission unit, which is configured to transmit M types of channels and/or signals by adopting the N basic transmission parameter sets, N≤M.

In an embodiment of the present disclosure, the N basic transmission parameter sets correspond to N respective channel or signal sets; and each of the N channel or signal sets includes at least one of the M types of channels and/or signals.

In an embodiment of the present disclosure, a correspondence between the N basic transmission parameter sets and the N channel or signal sets is determined by an agreement between a base station and a terminal or is determined by the base station and configured to the terminal.

The embodiments of the present disclosure provide a terminal, which includes:

a determination unit, which is configured to determine configuration of N basic transmission parameter sets, the N basic transmission parameter sets include one or more parameters of a group consisting of: a time domain signal length, a sub-carrier number, a sub-carrier density, a sub-carrier spacing, a frequency domain guard band, a time domain guard time length, a cyclic prefix (CP) length, the number of Fast Fourier Transformation (FFT) points, a baseband modulation mode; N>1;

a selection unit, which is configured to select, according to reference information, a target basic transmission parameter set from the N basic transmission parameter sets, wherein the reference information comprises at least one of: a type of a channel or signal to be transmitted, blind-detected preamble sequence information, a bandwidth, and/or the number of transmission layers, and/or the number of antenna ports; and a transmission unit, which is configured to transmit a channel or signal by adopting the selected target basic transmission parameter set.

In an embodiment of the present disclosure, the configuration of N basic transmission parameter sets is determined by an agreement between a base station and a terminal, or the terminal receives a configuration signaling and the configuration of N basic transmission parameter sets is determined according to the configuration signaling.

In an embodiment of the present disclosure, the reference information further includes a work frequency point and/or transmission mode configuration information.

In an embodiment of the present disclosure, the N basic transmission parameter sets correspond to N respective channel or signal sets.

The embodiments of the present disclosure provide a storage medium, which stores computer programs configured to execute the transmission parameter configuration method described above.

The embodiments of the present disclosure provide a storage medium, which stores computer programs configured to execute the information transmission method described above.

In the present disclosure, the base station configures N basic transmission parameter sets. The N basic transmission parameter sets include one or more parameters of a group consisting of: a time domain signal length, a sub-carrier number, a sub-carrier density, a sub-carrier spacing, a frequency domain guard band, a time domain guard time length, a cyclic prefix (CP) length, the number of Fast Fourier Transformation (FFT) points, a baseband modulation mode; where N>1. The base station transmits M types of channels and/or signals by adopting the N basic transmission parameter sets; where N≤M. The terminal determines configuration of the N basic transmission parameter sets. The terminal selects, according to reference information, a target basic transmission parameter set from the N basic transmission parameter sets, the reference information includes at least one of: a type of a channel or signal to be transmitted, blind-detected preamble sequence information, a bandwidth, and/or the number of transmission layers, and/or the number of antenna ports. The terminal transmits a channel or signal by adopting the selected target basic transmission parameter set. This can implement a dynamical switching of basic transmission parameters according to channel types, frequency points or current application scenarios, so that the information transmission is more flexible, guaranteeing robustness requirements of various types of channel signals while guaranteeing the resource utilization.

BRIEF DESCRIPTION OF DRAWINGS

In the drawings (which are not necessarily drawn to scale), similar reference numbers may denote similar components in different views. The similar reference numbers with different letter suffixes may denote different examples of the similar components. The drawings generally illustrate the various embodiments discussed in the present disclosure by way of examples and not limitations.

DETAILED DESCRIPTION

To provide a more detailed understanding of features and content of embodiments of the present disclosure, implementation of embodiments of the present disclosure is described below in detail with reference to the drawings. The drawings are provided for reference only and are not intended to limit embodiments of the present disclosure.

Figure 1:
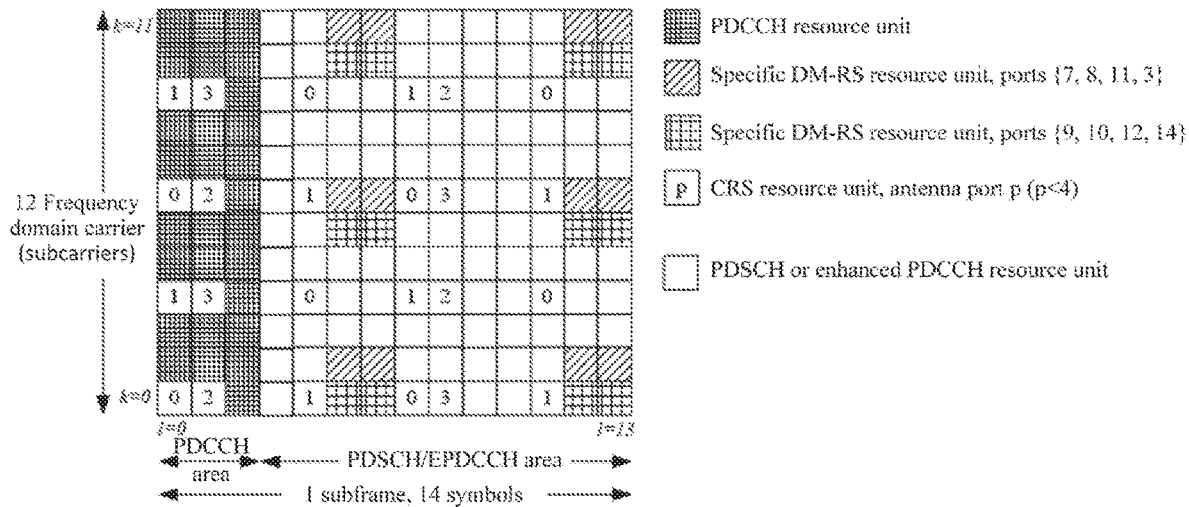
FIG. 1 is a mapping diagram of channels and reference signals in an LTE system.
Figure 2:
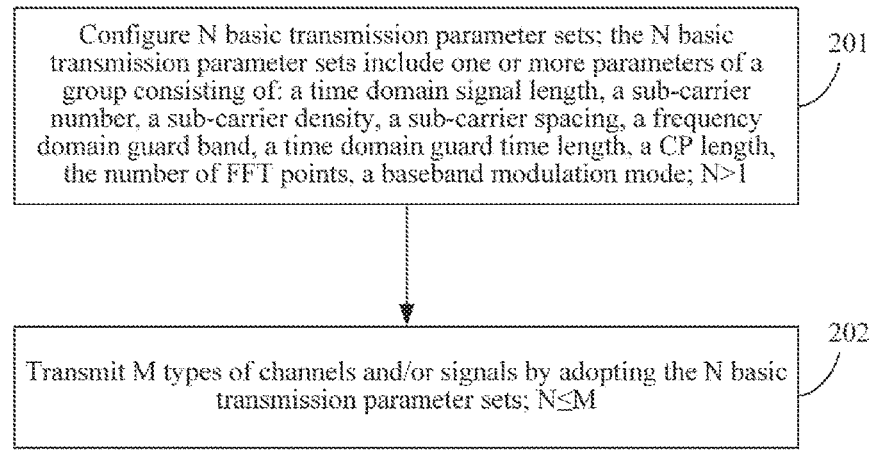
FIG. 2 is a flowchart of a transmission parameter configuration method according to an embodiment of the present disclosure.

FIG. 2 is a flowchart of a transmission parameter configuration method according to an embodiment of the present disclosure. The transmission parameter configuration method in this example is applied to a base station. As shown in FIG. 2, the transmission parameter configuration method includes the steps described below.

In step 201, N basic transmission parameter sets are configured. The N basic transmission parameter sets include one or more parameters of a group consisting of: a time domain signal length, a sub-carrier number, a sub-carrier density, a sub-carrier spacing, a frequency domain guard band, a time domain guard time length, a cyclic prefix (CP) length, the number of Fast Fourier Transformation (FFT) points, a baseband modulation mode. N>1.

Specifically, the base station configures the N basic transmission parameter sets.

In the embodiment of the present disclosure, the step in which configuring the N basic transmission parameter sets includes that the base station configures the N basic transmission parameter sets for a terminal.

In step 202, M types of channels and/or signals are transmitted by adopting the N basic transmission parameter sets. N≤M.

Specifically, the base station adopts the N basic transmission parameter sets to transmit the M types of channels and/or signals.

In an embodiment of the present disclosure, the N basic transmission parameter sets correspond to N respective channel or signal sets. Each of the N channel or signal sets includes at least one of the M types of channels and/or signals.

In an embodiment of the present disclosure, a correspondence between the N basic transmission parameter sets and the N channel or signal sets is determined by an agreement between the base station and the terminal or is determined by the base station and configured to the terminal.

In an implementation mode of the present disclosure, in the N channel or signal sets, at least one channel or signal set includes a data channel and at least one channel or signal set includes a control channel.

In an implementation mode of the present disclosure, in the N channel or signal sets, at least one channel or signal set includes a data channel, at least one other channel or signal set includes a control channel, and at least one other channel or signal set includes a reference signal.

In an implementation mode of the present disclosure, in the N channel or signal sets, at least one channel or signal set includes a data channel and at least one other channel or signal set includes a control channel and a reference signal.

In an implementation mode of the present disclosure, in the N channel or signal sets, at least one channel or signal set includes an uplink data channel and at least one other channel or signal set includes a downlink data channel.

In an implementation mode of the present disclosure, in the N channel or signal sets, at least one channel or signal set includes an uplink control channel and at least one other channel or signal set includes a downlink control channel.

In an implementation mode of the present disclosure, in the N channel or signal sets, at least one channel or signal set includes a demodulation reference signal and at least one other channel or signal set includes a measurement reference signal.

In an implementation mode of the present disclosure, in the N channel or signal sets, at least one channel or signal set includes an uplink reference signal and at least one other channel or signal set includes a downlink reference signal.

In one implementation mode of the present disclosure, in the N channel or signal sets, at least one channel or signal set includes a synchronization signal and at least one other channel or signal set includes a data channel.

In an implementation mode of the present disclosure, in the N channel or signal sets, at least one channel or signal set includes a synchronization signal and at least one other channel or signal set includes a reference signal.

In an implementation mode of the present disclosure, in the N channel or signal sets, at least one channel or signal set includes an uplink synchronization signal and at least one other channel or signal set includes a downlink synchronization signal.

In an implementation mode of the present disclosure, in the N channel or signal sets, at least one channel or signal set includes a synchronization signal and at least one other channel or signal set includes a control channel.

In the present disclosure, the meaning of transmission includes both transmitting and receiving.

Figure 3:
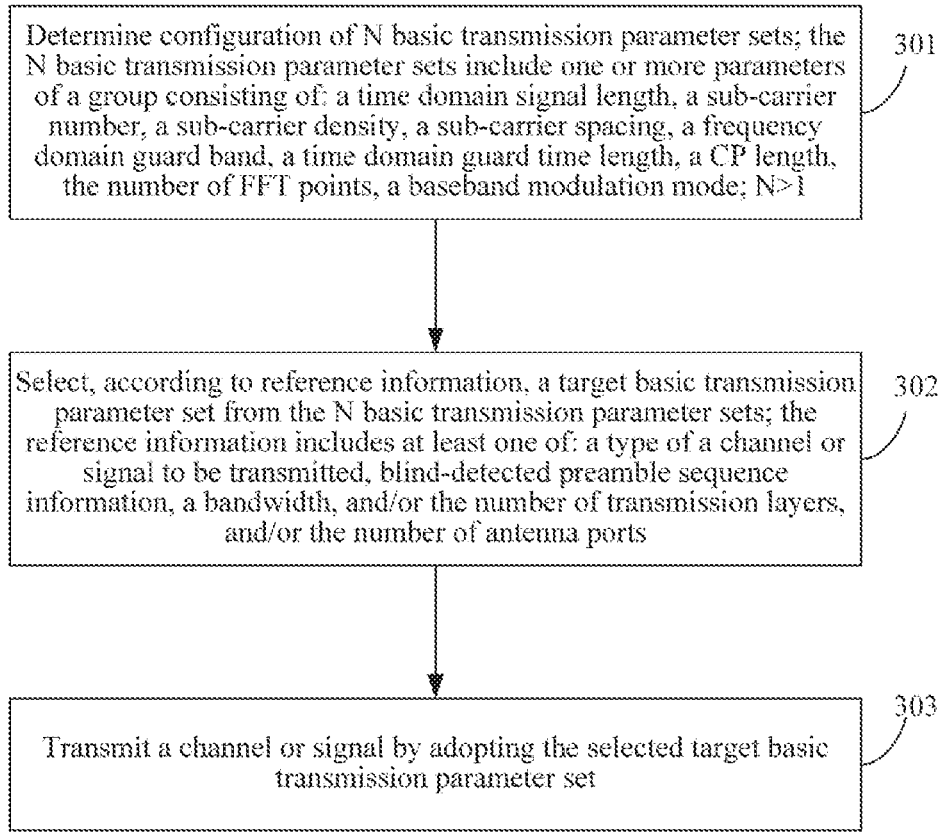
FIG. 3 is a flowchart of an information transmission method according to an embodiment of the present disclosure.

FIG. 3 is a flowchart of an information transmission method according to an embodiment of the present disclosure. The information transmission method of this example is applied to a terminal. As shown in FIG. 3, the information transmission method includes the steps described below.

In step 301, configuration of N basic transmission parameter sets are determined. The N basic transmission parameter sets include one or more parameters of a group consisting of: a time domain signal length, a sub-carrier number, a sub-carrier density, a sub-carrier spacing, a frequency domain guard band, a time domain guard time length, a cyclic prefix (CP) length, the number of Fast Fourier Transformation (FFT) points, a baseband modulation mode. $N>1$.

In the embodiment of the present disclosure, the configuration of the N basic transmission parameter sets is determined by an agreement between the terminal and a base station, or the terminal receives a configuration signaling of the base station, and determines the configuration of the N basic transmission parameter sets according to the configuration signaling.

In step 302, a target basic transmission parameter set is selected from the N basic transmission parameter sets according to reference information. The reference information includes at least one of: a type of a channel or signal to be transmitted, blind-detected preamble sequence information, a bandwidth, and/or the number of transmission layers, and/or the number of antenna ports.

Specifically, the type of the channel or signal to be transmitted is determined. One transmission parameter set is selected from the N basic transmission parameter sets as the target basic transmission parameter set according to the type of the channel or signal.

Additionally or alternatively, the terminal blindly detects a preamble sequence, and selects one transmission parameter set from the N basic transmission parameter sets as the target basic transmission parameter set according to the detected preamble sequence information.

Additionally or alternatively, the terminal selects one transmission parameter set from the N basic transmission parameter sets as the target basic transmission parameter set according to the bandwidth.

Additionally or alternatively, the terminal selects one transmission parameter set from the N basic transmission parameter sets as the target basic transmission parameter set according to the number of transmission layers.

Additionally or alternatively, the terminal selects one transmission parameter set from the N basic transmission parameter sets as the target basic transmission parameter set according to the number of antenna ports.

In an embodiment of the present disclosure, the reference information further includes a work frequency point and/or transmission mode configuration information.

In step 303, a channel or signal is transmitted by adopting the selected target basic transmission parameter set.

In an embodiment of the present disclosure, the N basic transmission parameter sets correspond to N respective channel or signal sets.

In an implementation mode of the present disclosure, in the N channel or signal sets, at least one channel or signal set includes a data channel and at least one other channel or signal set includes a control channel.

In an implementation mode of the present disclosure, in the N channel or signal sets, at least one channel or signal set includes a data channel and at least one other channel or signal set includes a control channel, and at least one other channel or signal set includes a reference signal. In one implementation mode of the present disclosure, in the N channel or signal sets, at least one channel or signal set includes a data channel and at least one other channel or signal set includes a control channel and reference signal.

In an implementation mode of the present disclosure, in the N channel or signal sets, at least one channel or signal set an uplink data channel and at least one other channel or signal set includes a downlink data channel.

In an implementation mode of the present disclosure, in the N channel or signal sets, at least one channel or signal set an uplink control channel and at least one other channel or signal set includes a downlink control channel.

In an implementation mode of the present disclosure, in the N channel or signal sets, at least one channel or signal set includes a demodulation reference signal and at least one other channel or signal set includes a measurement reference signal.

In an implementation mode of the present disclosure, in the N channel or signal sets, at least one channel or signal set includes an uplink reference signal and at least one other channel or signal set includes a downlink reference signal.

In an implementation mode of the present disclosure, in the N channel or signal sets, at least one channel or signal set includes a synchronization signal and at least one other channel or signal set includes a data channel.

In an implementation mode of the present disclosure, in the N channel or signal sets, at least one channel or signal set includes a synchronization signal and at least one other channel or signal set includes a reference signal.

In an implementation mode of the present disclosure, in the N channel or signal sets, at least one channel or signal set includes an uplink synchronization signal and at least one other channel or signal set includes a downlink synchronization signal.

In an implementation mode of the present disclosure, in the N channel or signal sets, at least one channel or signal set includes a synchronization signal and at least one other channel or signal set includes a control channel.

Figure 4:
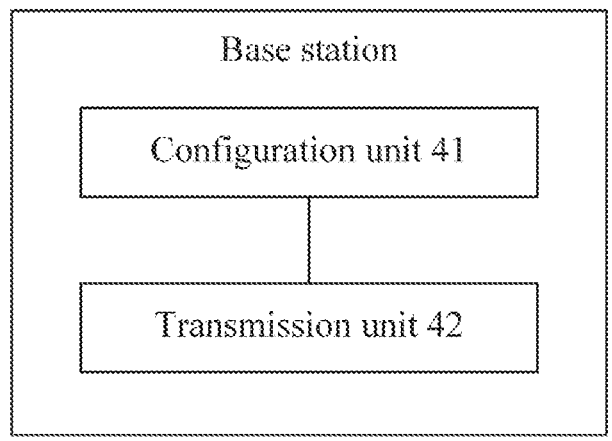
FIG. 4 is a structural diagram of a base station according to an embodiment of the present disclosure.

FIG. 4 is a structural diagram of a base station according to an embodiment of the present disclosure. As shown in FIG. 4, the base station includes a configuration unit 41 and a transmission unit 42.

The configuration unit 41 is configured to configure N basic transmission parameter sets, the N basic transmission parameter sets include one or more parameters of a group consisting of: a time domain signal length, a sub-carrier number, a sub-carrier density, a sub-carrier spacing, a frequency domain guard band, a time domain guard time length, a cyclic prefix (CP) length, a number of Fast Fourier Transformation (FFT) points, a baseband modulation mode; N>1.

The transmission unit 42 is configured to transmit M types of channels and/or signals by adopting the N basic transmission parameter sets, N≤M.

In an embodiment of the present disclosure, the configuration unit 41 is further configured to configure the N basic transmission parameter sets for a terminal.

In an embodiment of the present disclosure, the N basic transmission parameter sets correspond to N respective channel or signal sets. Each of the N channel or signal sets includes at least one of the M types of channels and/or signals.

In an embodiment of the present disclosure, a correspondence between the N basic transmission parameter sets and the N channel or signal sets is determined by an agreement between a base station and a terminal or is determined by the base station and configured to the terminal.

In an implementation mode of the present disclosure, in the N channel or signal sets, at least one channel or signal set includes a data channel and at least one channel or signal set includes a control channel.

In an implementation mode of the present disclosure, in the N channel or signal sets, at least one channel or signal set includes a data channel, at least one other channel or signal set includes a control channel, and at least one other channel or signal set includes a reference signal.

In an implementation mode of the present disclosure, in the N channel or signal sets, at least one channel or signal set includes a data channel and at least one other channel or signal set includes a control channel and a reference signal.

In an implementation mode of the present disclosure, in the N channel or signal sets, at least one channel or signal set includes an uplink data channel and at least one other channel or signal set includes a downlink data channel.

In an implementation mode of the present disclosure, in the N channel or signal sets, at least one channel or signal set includes an uplink control channel and at least one other channel or signal set includes a downlink control channel.

In an implementation mode of the present disclosure, in the N channel or signal sets, at least one channel or signal set includes a demodulation reference signal and at least one other channel or signal set includes a measurement reference signal.

In an implementation mode of the present disclosure, in the N channel or signal sets, at least one channel or signal set includes an uplink reference signal and at least one other channel or signal set includes a downlink reference signal.

In an implementation mode of the present disclosure, in the N channel or signal sets, at least one channel or signal set includes a synchronization signal and at least one other channel or signal set includes a data channel.

In an implementation mode of the present disclosure, in the N channel or signal sets, at least one channel or signal set includes a synchronization signal and at least one other channel or signal set includes a reference signal.

In an implementation mode of the present disclosure, in the N channel or signal sets, at least one channel or signal set includes an uplink synchronization signal and at least one other channel or signal set includes a downlink synchronization signal.

In an implementation mode of the present disclosure, in the N channel or signal sets, at least one channel or signal set includes a synchronization signal and at least one other channel or signal set includes a control channel.

In practice, functions of various units in the base station may all be implemented by a Central Processing Unit (CPU), a Micro Processor Unit (MPU), a Digital Signal Processor (DSP), or a Field Programmable Gate Array (FPGA) located in the base station.

It is to be noted that the above description of the device embodiment is similar to the above description of the method embodiment, and has similar beneficial effects as the method embodiment, which will not be repeated herein. For the technical details not disclosed in the device embodiment of the present disclosure, please understand with reference to the description of the method embodiment of the present disclosure. In order to save space, what has been described will not be repeated herein.

Figure 5:
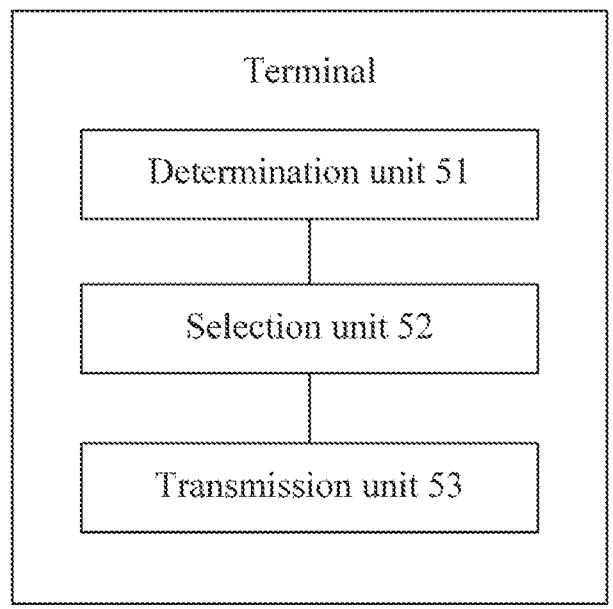
FIG. 5 is a structural diagram of a terminal according to an embodiment of the present disclosure.

FIG. 5 is a structural diagram of a terminal according to an embodiment of the present disclosure. As shown in FIG. 5, the terminal includes a determination unit 51, a selection unit 52 and a transmission unit 53.

The determination unit 51 is configured to determine configuration of N basic transmission parameter sets, the N basic transmission parameter sets include one or more parameters of a group consisting of: a time domain signal length, a sub-carrier number, a sub-carrier density, a sub-carrier spacing, a frequency domain guard band, a time domain guard time length, a cyclic prefix (CP) length, a number of Fast Fourier Transformation (FFT) points, a baseband modulation mode; N>1.

The selection unit 52 is configured to select, according to reference information, a target basic transmission parameter set from the N basic transmission parameter sets, the reference information includes at least one of: a type of a channel or signal to be transmitted, blind-detected preamble sequence information, a bandwidth, and/or a number of transmission layers, and/or a number of antenna ports.

The transmission unit 53 is configured to transmit a channel or signal by adopting the selected target basic transmission parameter set.

In an embodiment of the present disclosure, the configuration of the N basic transmission parameter sets is determined by an agreement between the terminal and a base station, or the terminal receives a configuration signaling of the base station, and determines the configuration of the N basic transmission parameter sets according to the configuration signaling.

In an embodiment of the present disclosure, the reference information further includes a work frequency point and/or transmission mode configuration information.

In an embodiment of the present disclosure, the N basic transmission parameter sets correspond to N respective channel or signal sets.

In an implementation mode of the present disclosure, in the N channel or signal sets, at least one channel or signal set includes a data channel and at least one other channel or signal set includes a control channel.

In an implementation mode of the present disclosure, in the N channel or signal sets, at least one channel or signal set includes a data channel and at least one other channel or signal set includes a control channel, and at least one other channel or signal set includes a reference signal.

In an implementation mode of the present disclosure, in the N channel or signal sets, at least one channel or signal set includes a data channel and at least one other channel or signal set includes a control channel and reference signal.

In an implementation mode of the present disclosure, in the N channel or signal sets, at least one channel or signal set an uplink data channel and at least one other channel or signal set includes a downlink data channel.

In an implementation mode of the present disclosure, in the N channel or signal sets, at least one channel or signal set an uplink control channel and at least one other channel or signal set includes a downlink control channel.

In an implementation mode of the present disclosure, in the N channel or signal sets, at least one channel or signal set includes a demodulation reference signal and at least one other channel or signal set includes a measurement reference signal.

In an implementation mode of the present disclosure, in the N channel or signal sets, at least one channel or signal set includes an uplink reference signal and at least one other channel or signal set includes a downlink reference signal.

In an implementation mode of the present disclosure, in the N channel or signal sets, at least one channel or signal set includes a synchronization signal and at least one other channel or signal set includes a data channel.

In an implementation mode of the present disclosure, in the N channel or signal sets, at least one channel or signal set includes a synchronization signal and at least one other channel or signal set includes a reference signal.

In an implementation mode of the present disclosure, in the N channel or signal sets, at least one channel or signal set includes an uplink synchronization signal and at least one other channel or signal set includes a downlink synchronization signal.

In an implementation mode of the present disclosure, in the N channel or signal sets, at least one channel or signal set includes a synchronization signal and at least one other channel or signal set includes a control channel.

In practice, functions of various units in the terminal may all be implemented by a CPU, a MPU, a DSP, or a FPGA located in the terminal.

It is to be noted that the above description of the device embodiment is similar to the above description of the method embodiment, and has similar beneficial effects as the method embodiment, which will not be repeated herein. For the technical details not disclosed in the device embodiment of the present disclosure, please understand with reference to the description of the method embodiment of the present disclosure. In order to save space, what has been described will not be repeated herein.

The transmission parameter configuration method and information transmission method provided by the embodiments of the present disclosure will be described in detail in conjunction with specific application scenarios.

Application Scenario 1:

In a general OFDM-based wireless communication system, basic transmission parameters include, but are not limited to, some classifications described below.

A time domain signal length refers to the length of one OFDM symbol. Modulation symbols are carried on a number M of OFDM subcarriers. These subcarriers are transformed to the time domain and constitute into a time domain sample point. In consideration of guard periods, these subcarriers form into a time domain OFDM symbol. Generally speaking, the OFDM symbol length is related to a subcarrier number and subcarrier spacing in the frequency domain. In case of constant bandwidth, the bigger the subcarrier number is, the smaller the period is, and the longer the length of the OFDM symbol is. Alternatively, in case of constant subcarrier spacing, the larger the subcarrier number, the longer the length of the OFDM symbol is; and vice versa.

The subcarrier number refers to the number of subcarriers carrying the modulation symbols and corresponding to the one OFDM symbol in the frequency domain.

A subcarrier spacing refers to a center frequency period between the subcarriers. Generally speaking, to maintain orthogonality, the smaller the subcarrier spacing is, the higher the waveform requirements are required, the longer the window in the time domain is, and the longer the length of the time domain symbol is, and vice versa.

A frequency domain guard band refers to bandwidths on both sides of the bandwidth for information transmission. For example, in the current LTE system, actually only 100 RBs are used in 20 MHz bandwidth, only 1200 subcarriers, that is, total 18 MHz bandwidth are occupied, which means that a 2 MHz guard band is reserved. The guard band is generally reserved on both sides of the bandwidth, which mainly prevent effects of out-of-band leakage on performance when other wireless communication systems transmit information.

A cyclic prefix usually refers to the prefix added to at least part of time domain sample points formed from transforming of frequency domain symbols into the time domain. The prefix is generally a copy of last sample points of a series of time domain sample points. For example, a series of signals 0,1,2,3,4,5,6,7,8,9, together with a cyclic prefix with a length of 4, forms 6,7,8,9,0,1,2,3,4,5,6,7,8,9.

Figure 6:
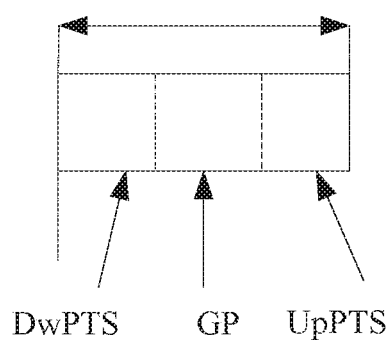
FIG. 6 is a schematic diagram of a time domain guard period.

A time domain guard time length is a guard time which generally may refer to guard time for the switching between uplink and downlink (receiving/transmitting), and may also refer to conversion time for switching a radio frequency beam. In the LTE, a time domain guard period (GP) is defined in a special sunframe including uplink and downlink conversion. As shown in FIG. 6, in a downlink pilot time slot (DwPTS), downlink symbols are transmitted; and in an uplink pilot time slot (UpPTS), uplink symbols are transmitted. There are multiple special subframe configurations as illustrated in table 1 below.

TABLE 1

| Special subframe configuration | Downlink normal CP | | | Downlink extension CP | | |
|---|---|---|---|---|---|---|
| | DwPTS | UpPTS | | DwPTS | UpPTS | |
| | | Uplink normal CP | Uplink extension CP | | Uplink normal CP | Uplink extension CP |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

At high frequencies, when radio frequency precoding exists, switching from one precoding to another precoding requires certain processing time, so a similar guard period is also required. Similar guard period concepts also exist in other places, various guard periods are all considered as one of basic transmission parameters in the present disclosure.

The number of Fast Fourier Transformation (FFT) points is generally related to the subcarrier number and bandwidth of a baseband, but is not completely equal to the number of valid subcarriers. For example, for a 20 MHz/10 MHz LTE system, 2048 points and 1024 points are adopted respectively, but the number of valid subcarriers is just 1200 and 600.

A baseband modulation mode, may be a common type of OFDM waveform, and may be other types such as UMFC, GFMD, F-OFDM, DFT-s-OFDM, NC-OFDM, BFDM, SC, BFDM.

Generally, in the 4G system, the same channel takes use of same parameters among these basic transmission parameters in one subframe. For example, a control channel, data channel and reference signal all use the same basic transmission parameters, such as one RB of twelve subcarriers and the subcarrier spacing of 15 KHz.

In the embodiment of the present disclosure, the base station adopts N>1 basic parameters. Each basic parameter may be configured to include one or more modes described above. N basic parameters correspond to M types of signals, where N<=M.

Preferably, the base station configures the N basic parameters for the terminal in a common mode of signaling configuration. Alternatively, the base station and the terminal previously agree that the N basic parameter configuration binds to which types of the channel or signal. Table 2 is given below.

TABLE 2

| Channel (signal) group | Basic transmission parameter set |
|---|---|
| Group 1: channel A, signal a | Configuration 1 |
| Group 2: channel B | Configuration 2 |
| Group 3: channel B | Configuration 3 |

Another case is channels or signals of different groups have an intersection, as shown in table 3 below.

TABLE 3

| Channel (signal) group | Basic transmission parameter set |
|---|---|
| Group 1: channel A, B, signal a | Configuration 1 |
| Group 2: channel A, B, signal b | Configuration 2 |

In this case, the base station also needs to further determine that channels A and B adopt which parameter and notifies to the terminal. The notification mode may be a signaling or some preamble sequences to indicate.

After the base station determines the basic transmission parameters, the channel or signal transmission may be performed according to these basic transmission parameters.

For the terminal, the terminal needs to determine N basic parameter configurations. The determination mode may adopt a way of receiving a configuration signaling from the base station or previously agreeing the N basic parameter configurations with the base station.

A receiving end needs to determine the type of the channel or signal type to be received or transmitted, and select one basic transmission parameter set from the N basic transmission parameter sets according to the type of the channel or signal.

In the case shown in table 2, the terminal may make determination according to the table 4-1 below.

TABLE 4-1

| Type of the channel (signal) | Basic transmission parameter set |
|---|---|
| Channel A, | Configuration 1 |
| Signal a | Configuration 1 |
| Channel B | Configuration 2 |
| Signal b | Configuration 3 |

In the case shown in table 3, the terminal may make determination according to the table 4-2 below.

TABLE 4-2

| Channel (signal) group | Basic transmission parameter set |
| --- | --- |
| Channel A, | Configuration 1 or 2 |
| Channel B, | Configuration 1 or 2 |
| Signal a | Configuration 1 |
| Signal b | Configuration 2 |

In this case, an additional indication may be used for determining whether configuration 1 or configuration 2 is used for channel A and channel B.

Another case that may arise is configuration selection may be determined by detected preamble sequence information, such as table 5.

TABLE 5

| Preamble sequence | Basic transmission parameter set |
| --- | --- |
| Sequence a | Configuration 1 |
| Sequence b | Configuration 2 |

This method may be used independently, or may be used for further determining configuration selection information of Channel A and Channel B in the above table 4.

In another possible case where the selection of the configuration may be made based on bandwidth information, such as tables 6 and 7 below.

TABLE 6

| Bandwidth | Basic transmission parameter set |
| --- | --- |
| $<=B_1$ MHz | Configuration 1 |
| $>B_1$ MHz | Configuration 2 |

TABLE 7

| Bandwidth | Basic transmission parameter set |
| --- | --- |
| $<=B_2$ MHz | Configuration 1 |
| $<=B_1$ MHz & $>B_2$ MHz | Configuration 2 |
| $>B_1$ MHz | Configuration 3 |

This method may be used independently, or may be used for further determining the configuration selection information of Channel A and Channel B in the above table 4.

In another possible case where the selection of the configuration may be made based on information of the number of transmission layers, such as tables 8 and 9 below.

TABLE 8

| Number of layers | Basic transmission parameter set |
| --- | --- |
| 1 layer | Configuration 1 |
| ≥2 layers | Configuration 2 |

TABLE 9

| Number of layers | Basic transmission parameter set |
| --- | --- |
| 1 layer | Configuration 1 |
| 2 layers | Configuration 2 |
| >2 layers | Configuration 3 |

This method may be used independently, or may be used for further determining the configuration selection information of Channel A and Channel B in the above table 4. In another possible case where the selection of the configuration may be made based on information of the number of transmission ports, such as tables 10 and 11 below.

TABLE 10

| Number of ports | Basic transmission parameter set |
| --- | --- |
| 1 port | Configuration 1 |
| ≥2 ports | Configuration 2 |

TABLE 11

| Number of ports | Basic transmission parameter set |
| --- | --- |
| 1 port | Configuration 1 |
| 2 ports | Configuration 2 |
| >2 ports | Configuration 3 |

This method may be used independently, or may be used for further determining the configuration selection information of Channel A and Channel B in the above table 4. This case is generally the case where pilot time domain transmission resources are relatively fixed, transmitting more ports decreases the time domain symbol length and increases the number of time domain symbols. Therefore, generally the larger number of ports corresponds to a shorter symbol length in the basic transmission parameter configuration.

Therefore, if the configuration of the basic transmission parameter sets cannot be independently determined by the number of layers, the number of ports, bandwidth, preamble sequence, the type of the channel or signal, the terminal may select one basic transmission parameter set from the N transmission parameter sets in conjunction with the work frequency point.

Therefore, if the configuration of the basic transmission parameter sets cannot be independently determined by the number of layers, the number of ports, bandwidth, preamble sequence, the type of the channel or signal, the terminal may select one basic transmission parameter set from the N transmission parameter sets in conjunction with the transmission mode.

Application Scenario 2

The embodiment of the present disclosure mainly illustrates the division of the N channel (signal) sets.

One division method is that when N≥2, at least one channel or signal set includes a data channel, and at least one other channel or signal set include a control channel, as shown in table 12 below.

TABLE 12

| Channel (signal) set | Basic transmission parameter set |
| --- | --- |
| Data channel | Configuration 1 |
| Control channel | Configuration 2 |

One division method is that when N≥3, at least one channel or signal set includes a data channel, at least one other channel or signal set include a control channel and at least one other channel or signal set include a reference signal, as shown in table 13 below.

TABLE 13

| Channel (signal) set | Basic transmission parameter set |
| --- | --- |
| Data channel | Configuration 1 |
| Control channel | Configuration 2 |
| Reference signal | Configuration 3 |

One division method is that when N≥2, at least one channel or signal set includes a data channel, at least one other channel or signal set include a control channel and a reference signal, as shown in table 14 below.

TABLE 14

| Channel (signal) set | Basic transmission parameter set |
| --- | --- |
| Data channel | Configuration 1 |
| Control channel and reference signal | Configuration 2 |

One division method is that when N≥2, at least one channel or signal set includes an uplink data channel, and at least one other channel or signal set includes a downlink data channel, as shown in table 15 below.

TABLE 15

| Channel (signal) set | Basic transmission parameter set |
| --- | --- |
| Uplink data channel | Configuration 1 |
| Downlink data channel | Configuration 2 |

One division method is that when N≥2, at least one channel or signal set includes an uplink control channel, and at least one other channel or signal set includes a downlink control channel, as shown in table 16 below.

TABLE 16

| Channel (signal) set | Basic transmission parameter set |
| --- | --- |
| Uplink control channel | Configuration 1 |
| Downlink control channel | Configuration 2 |

One division method is that when N≥2, at least one channel or signal set includes a measurement reference signal and at least one other channel or signal set includes a demodulation reference signal, as shown in table 17 below.

TABLE 17

| Channel (signal) set | Basic transmission parameter set |
| --- | --- |
| Demodulation reference signal | Configuration 1 |
| Measurement reference signal | Configuration 2 |

One division method is that when N≥2, at least one channel or signal set includes an uplink reference signal, and at least one other channel or signal set includes a downlink reference signal, as shown in table 18 below.

TABLE 18

| Channel (signal) set | Basic transmission parameter set |
| --- | --- |
| Uplink reference signal | Configuration 1 |
| Downlink reference signal | Configuration 2 |

One division method is that when N≥2, at least one channel or signal set includes a synchronization signal, and at least one other channel or signal set includes a data channel, as shown in table 19 below.

TABLE 19

| Channel (signal) set | Basic transmission parameter set |
| --- | --- |
| Synchronization signal | Configuration 1 |
| Data channel | Configuration 2 |

One division method is that when N≥2, at least one channel or signal set includes a synchronization signal, and at least one other channel or signal set includes a reference signal channel, as shown in table 20 below.

TABLE 20

| Channel (signal) set | Basic transmission parameter set |
| --- | --- |
| Synchronization signal | Configuration 1 |
| Reference signal | Configuration 2 |

One division method is that when N≥2, at least one channel or signal set includes an uplink synchronization signal, and at least one other channel or signal set includes a downlink synchronization signal, as shown in table 21 below.

TABLE 21

| Channel (signal) set | Basic transmission parameter set |
| --- | --- |
| Downlink synchronization signal | Configuration 1 |
| Uplink synchronization signal | Configuration 2 |

One division method is that when N≥2, at least one channel or signal set includes a synchronization signal, and at least one other channel or signal set includes a control channel, as shown in table 22 below.

TABLE 22

| Channel (signal) set | Basic transmission parameter set |
| --- | --- |
| Synchronization signal | Configuration 1 |
| Control channel | Configuration 2 |

Application Scenario 3

Figure 7:
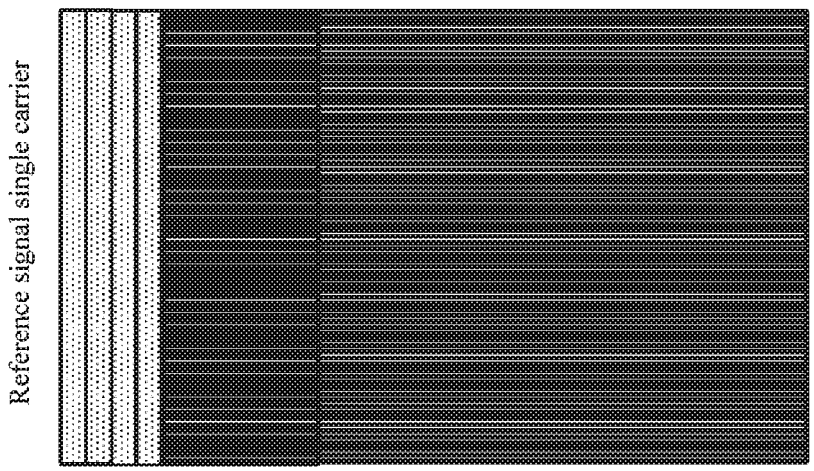
FIG. 7 is a schematic diagram of application scenario 3 according to an embodiment of the present disclosure.

Using the subcarrier density and different time domain symbol lengths as an example to illustrate the channel or signal transmission situation in the method of the present disclosure, as shown in FIG. 7, the reference signal uses a single subcarrier transmission. The control channel uses an Nb carrier symbol transmission, which may have multiple control symbols. The data channel adopts a 2 Nb carrier symbol transmission, which may avoid resource waste of too many subcarriers on the control and reference signal frequency domain.

Figure 8:
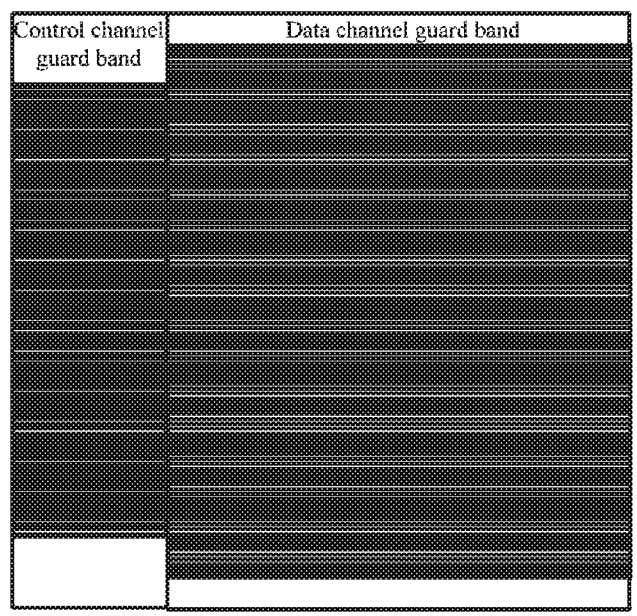
FIG. 8 is a schematic diagram of application scenario 4 according to an embodiment of the present disclosure.

Application Scenario 4:

Using the guard band as an example to illustrate the channel or signal transmission situation in the method of the present disclosure, as shown in FIG. 8, the control channel uses a more bigger guard band to guard in order to obtain a better performance, avoid effects of out-of-band leakage, and have a better transmission robustness. The data channel uses a smaller guard band to pursue a fuller use of bandwidth. The control channel herein may be substituted into a synchronization signal.

Figure 9:
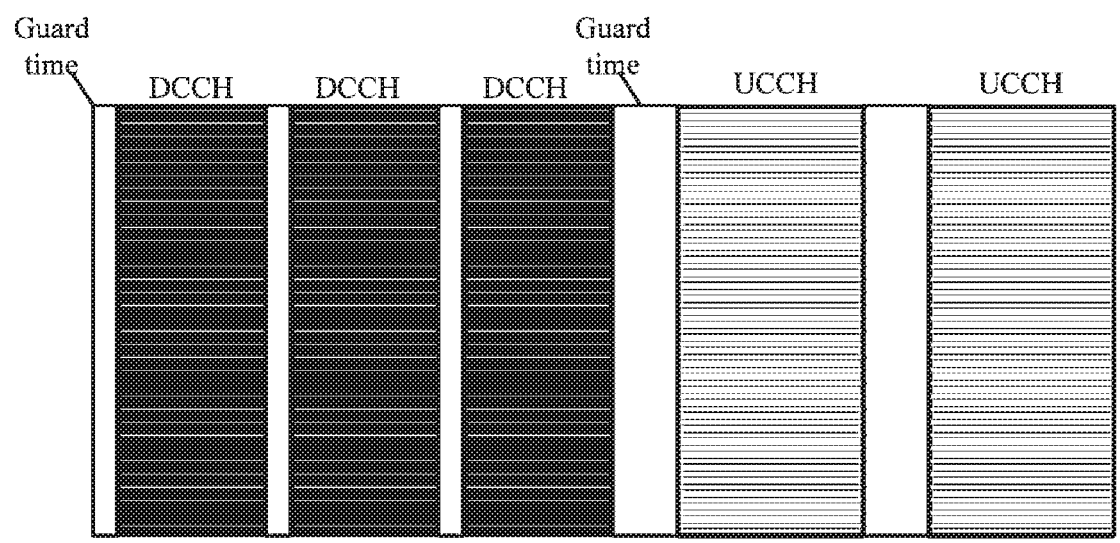
FIG. 9 is a schematic diagram of application scenario 5 according to an embodiment of the present disclosure.

Application Scenario 5:

Using the guard time as an example to illustrate the channel signal transmission situation in the method of the present disclosure, as shown in FIG. 9, the uplink and downlink control channel provide different guard time. The different guard time is mainly configured according to different processing capacities.

Figure 10:
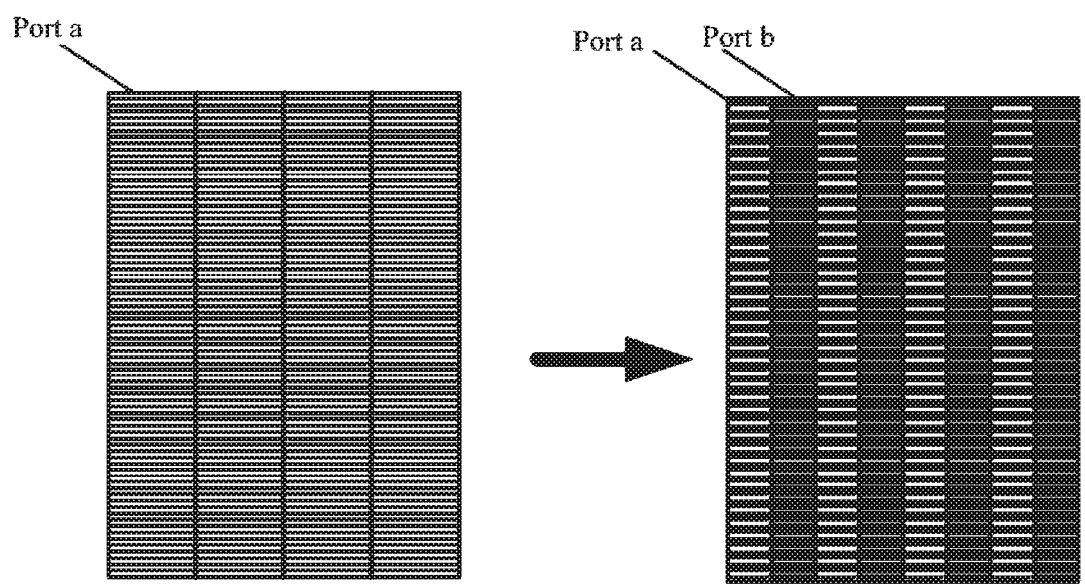
FIG. 10 is a schematic diagram of application scenario 6 according to an embodiment of the present disclosure.

Application Scenario 6:

With different transmission ports or transmission layers, the symbol length and the subcarrier number may be flexibly changed. For example, when only port a is provided, the transmission is performed as shown in the left image of FIG. 10; when port a and port b are provided, the transmission is performed as shown in the right image of FIG. 10.

It is to be understood by those skilled in the art that the embodiments of the present disclosure may be provided as methods, systems and computer program products. Therefore, the present disclosure may adopt a mode of a hardware embodiment, a software embodiment, or a combination of hardware and software embodiment. In addition, the present disclosure may take the form of a computer program product implemented in one or more computer-usable storage media (including, but not limited to, a disk memory and an optical memory) that includes computer-usable program codes.

The present disclosure is described with reference to flowcharts and/or block diagrams of methods, apparatuses (systems) and computer program products according to the embodiments of the present disclosure. It should be understood that computer program instructions implement each flow and/or block in the flowcharts and/or block diagrams and a combination of flows and/or blocks in the flowcharts and/or block diagrams. These computer program instructions can be provided to a general-purpose computer, a special-purpose computer, an embedded processor or a processor of other programmable data processing apparatuses to produce a machine so that instructions executed by a computer or a processor of other programmable data processing apparatuses produce a means for implementing the functions specified in one or more flows in the flowcharts and/or one or more blocks in the block diagrams.

These computer program instructions can also be stored in a computer-readable memory which can direct a computer or other programmable data processing apparatuses to operate in a particular manner so that the instructions stored in the computer-readable memory produce a manufactured product including an instruction device. The instruction device implements the functions specified in one or more flows in the flowcharts and/or one or more blocks in the block diagrams.

These computer program instructions can also be loaded onto a computer or other programmable data processing apparatuses so that a series of operation steps are performed on the computer or other programmable apparatuses to produce processing implemented by a computer. Therefore, instructions executed on a computer or other programmable apparatuses provide steps for implementing the functions specified in one or more flows in the flowcharts and/or one or more blocks in the block diagrams.

Accordingly, a storage medium further provided by an embodiment of the present disclosure stores computer-executable instructions which are configured to execute the above transmission parameter configuration method.

In addition, a storage medium further provided by an embodiment of the present disclosure stores computer-executable instructions which are configured to execute the above information transmission method.

The above are only preferred embodiments of the present disclosure and are not intended to limit the scope of the present disclosure.

What is claimed is:

1. A transmission parameter configuration method, comprising
configuring N basic transmission parameter sets, wherein the N basic transmission parameter sets comprise one or more parameters of a group consisting of: a time domain signal length, a sub-carrier number, a sub-carrier density, a sub-carrier spacing, a frequency domain guard band, a time domain guard time length, a cyclic prefix (CP) length, a number of Fast Fourier Transformation (FFT) points, and a baseband modulation mode; wherein N>1; and
transmitting M types of channels and/or signals by adopting the N basic transmission parameter sets, wherein N≤M,
wherein the N basic transmission parameter sets correspond to N respective channel or signal sets;
wherein each of the N channel or signal sets comprises at least one of the M types of channels and/or signals; and
wherein the method is performed by at least one processor.

2. The transmission parameter configuration method according to claim 1, wherein the configuring N basic transmission parameter sets comprises: configuring the N basic transmission parameter sets for a terminal.

3. The transmission parameter configuration method according to claim 1, wherein a correspondence between the N basic transmission parameter sets and the N channel or signal sets is determined by an agreement between a base station and a terminal or is determined by the base station and configured to the terminal.

4. The transmission parameter configuration method according to claim 1, wherein in the N channel or signal sets, at least one channel or signal set comprises a data channel and at least one channel or signal set comprises a control channel; or
in the N channel or signal sets, at least one channel or signal set comprises a data channel, at least one other channel or signal set comprises a control channel, and at least one other channel or signal set comprises a reference signal; or
in the N channel or signal sets, at least one channel or signal set comprises a data channel and at least one other channel or signal set comprises a control channel and a reference signal; or
in the N channel or signal sets, at least one channel or signal set comprises a demodulation reference signal and at least one other channel or signal set comprises a measurement reference signal.

5. The transmission parameter configuration method according to claim 1, wherein in the N channel or signal sets, at least one channel or signal set comprises an uplink data channel and at least one other channel or signal set comprises a downlink data channel; or
in the N channel or signal sets, at least one channel or signal set comprises an uplink control channel and at least one other channel or signal set comprises a downlink control channel; or
in the N channel or signal sets, at least one channel or signal set comprises an uplink reference signal and at least one other channel or signal set comprises a downlink reference signal.

6. The transmission parameter configuration method according to claim 1, wherein in the N channel or signal sets, at least one channel or signal set comprises a synchronization signal and at least one other channel or signal set comprises a data channel; or in the N channel or signal sets, at least one channel or signal set comprises a synchronization signal and at least one other channel or signal set comprises a reference signal; or in the N channel or signal sets, at least one channel or signal set comprises an uplink synchronization signal and at least one other channel or signal set comprises a downlink synchronization signal; or in the N channel or signal sets, at least one channel or signal set comprises a synchronization signal and at least one other channel or signal set comprises a control channel.

7. A storage medium, wherein the storage medium stores computer-executable instructions configured to execute the transmission parameter configuration method according to claim 1.

8. An information transmission method, comprising:
determining configuration of N basic transmission parameter sets, wherein the N basic transmission parameter sets comprise one or more parameters of a group consisting of: a time domain signal length, a sub-carrier number, a sub-carrier density, a sub-carrier spacing, a frequency domain guard band, a time domain guard time length, a cyclic prefix (CP) length, a number of Fast Fourier Transformation (FFT) points, and a baseband modulation mode; wherein N>1;
selecting, according to reference information, a target basic transmission parameter set from the N basic transmission parameter sets, wherein the reference information comprises at least one of: a type of a channel or signal to be transmitted, blind-detected preamble sequence information, a bandwidth, and/or a number of transmission layers, and/or a number of antenna ports; and
transmitting a channel or signal by adopting the selected target basic transmission parameter set,
wherein the N basic transmission parameter sets correspond to N respective channel or signal sets, and
wherein the method is performed by at least one processor.

9. The information transmission method according to claim 8, wherein the configuration of the N basic transmission parameter sets is determined by an agreement between a terminal and a base station, or the terminal receives a configuration signaling of the base station, and determines the configuration of the N basic transmission parameter sets according to the configuration signaling.

10. The information transmission method according to claim 8, wherein the reference information further comprises a work frequency point and/or transmission mode configuration information.

11. The information transmission method according to claim 8, wherein in the N channel or signal sets, at least one channel or signal set comprises a data channel and at least one other channel or signal set comprises a control channel; or in the N channel or signal sets, at least one channel or signal set comprises a data channel and at least one other channel or signal set comprises a control channel, and at least one other channel or signal set comprises a reference signal; or in the N channel or signal sets, at least one channel or signal set comprises a data channel and at least one other channel or signal set comprises a control channel and a reference signal; or in the N channel or signal sets, at least one channel or signal set comprises a demodulation reference signal and at least one other channel or signal set comprises a measurement reference signal.

12. The information transmission method according to claim 8, wherein in the N channel or signal sets, at least one channel or signal set comprises an uplink data channel and at least one other channel or signal set comprises a downlink data channel; or in the N channel or signal sets, at least one channel or signal set comprises an uplink control channel and at least one other channel or signal set comprises a downlink control channel; or in the N channel or signal sets, at least one channel or signal set comprises an uplink reference signal and at least one other channel or signal set comprises a downlink reference signal.

13. The information transmission method according to claim 8, wherein in the N channel or signal sets, at least one channel or signal set comprises a synchronization signal and at least one other channel or signal set comprises a data channel; or in the N channel or signal sets, at least one channel or signal set comprises a synchronization signal and at least one other channel or signal set comprises a reference signal; or in the N channel or signal sets, at least one channel or signal set comprises an uplink synchronization signal and at least one other channel or signal set comprises a downlink synchronization signal; or in the N channel or signal sets, at least one channel or signal set comprises a synchronization signal and at least one other channel or signal set comprises a control channel.

14. A storage medium, wherein the storage medium stores computer-executable instructions configured to execute the information transmission method according to claim 8.

15. A terminal, comprising:
a processor; and
a memory configured to store instructions executable by the processor,
wherein the processor is configured to execute the information transmission method according to claim 8.

16. The terminal according to claim 15, wherein the configuration of N basic transmission parameter sets is determined by an agreement between a base station and a terminal, or the terminal receives a configuration signaling and the configuration of N basic transmission parameter sets is determined according to the configuration signaling.

17. The terminal according to claim 15, wherein the reference information further comprises a work frequency point and/or transmission mode configuration information.

18. A base station, comprising:
a processor; and
a memory configured to store instructions executable by the processor,
wherein the processor is configured to:
configure N basic transmission parameter sets, wherein the N basic transmission parameter sets comprise one or more parameters of a group consisting of: a time domain signal length, a sub-carrier number, a sub-carrier density, a sub-carrier spacing, a frequency domain guard band, a time domain guard time length, a cyclic prefix (CP) length, a number of Fast Fourier Transformation (FFT) points, and a baseband modulation mode; wherein $N>1$; and transmit M types of channels and/or signals by adopting the N basic transmission parameter sets, wherein $N \leq M$, wherein the N basic transmission parameter sets correspond to N respective channel or signal sets; and wherein each of the N channel or signal sets comprises at least one of the M types of channels and/or signals.

19. The base station according to claim 18, wherein correspondence between the N basic transmission parameter sets and the N channel or signal sets is determined by an agreement between a base station and a terminal or is determined by the base station and configured to the terminal.

20. The base station according to claim 18, wherein in the configuration of the N basic transmission parameter sets, the processor is configured to configure the N basic transmission parameter sets for a terminal.

* * * * *